United States Patent [19]

Deane

[11] Patent Number: 5,636,550
[45] Date of Patent: Jun. 10, 1997

[54] NO-BACKLASH GEARING MECHANISM

[75] Inventor: Daniel Deane, Bretton, Great Britain

[73] Assignee: Perkins Limited, Cambridgeshire, Great Britain

[21] Appl. No.: 495,670

[22] PCT Filed: Nov. 29, 1994

[86] PCT No.: PCT/GB94/02607

§ 371 Date: Jul. 26, 1995

§ 102(e) Date: Jul. 26, 1995

[87] PCT Pub. No.: WO95/16153

PCT Pub. Date: Jun. 15, 1995

[30] Foreign Application Priority Data

Dec. 6, 1993 [GB] United Kingdom ............... 9324968

[51] Int. Cl.$^6$ .................................................. F16H 55/18
[52] U.S. Cl. ......................... 74/409; 74/461; 74/462
[58] Field of Search ........................ 74/409, 440, 461, 74/462, 466

[56] References Cited

U.S. PATENT DOCUMENTS

| 1,443,837 | 1/1923 | Eberhardt | 74/466 |
|---|---|---|---|
| 1,702,860 | 2/1929 | Bottcher | 74/466 |
| 2,065,021 | 12/1936 | Pioch et al. | 74/462 |
| 2,572,334 | 10/1951 | Guibert | 74/461 |
| 2,764,034 | 9/1956 | Hotine | 74/440 |
| 3,122,938 | 3/1964 | Visser | 74/409 |
| 3,292,390 | 12/1966 | Wildhaber | 74/462 |
| 4,552,030 | 11/1985 | Szecsei | 74/462 |

FOREIGN PATENT DOCUMENTS

| A-0 084 197 | 7/1983 | European Pat. Off. . | |
| A-046 802 | 3/1992 | European Pat. Off. . | |
| 340544 | 9/1921 | Germany | 74/466 |
| 846192 | 11/1951 | Germany . | |
| 59-117951 | 7/1984 | Japan | 74/409 |
| 288664 | 11/1989 | Japan | 74/440 |
| 421098 | 12/1934 | United Kingdom . | |
| 932015 | 7/1963 | United Kingdom . | |
| 1047328 | 11/1966 | United Kingdom . | |
| 1202806 | 8/1970 | United Kingdom . | |
| 1251941 | 11/1971 | United Kingdom . | |
| 2275318 | 8/1994 | United Kingdom | 74/461 |

OTHER PUBLICATIONS

Patent Abstract of Japan, vol. 8, No. 238, Oct. 1984, JP–A–59 117951.

*Primary Examiner*—Charles A. Marmor
*Assistant Examiner*—Troy Grabow
*Attorney, Agent, or Firm*—Nilles & Nilles, S.C.

[57] ABSTRACT

A no back-lash gearing mechanism comprises meshing toothed elements. At least one of the toothed elements has a number of teeth having an undulated, "S"-shaped, transverse section. The teeth are arranged such that, when the toothed elements mesh, one of the teeth having the undulated form makes at least one point of contact with each of two opposing adjacent teeth of the other element thus preventing back-lash.

18 Claims, 3 Drawing Sheets

NO-BACKLASH GEARING MECHANISM

BACKGROUND OF THE INVENTION

1. Field of the Invention

The present invention relates to a no-backlash gearing mechanism.

2. Discussion of the Related Art

A no-backlash gearing mechanism is disclosed in United Kingdom patent specification No. 1 251 941 in which the teeth of at least one of a pair of meshing toothed elements are formed of elastic rubber or plastics material and may additionally be formed with slots or bores to improve their deformability. By urging the toothed elements together when meshing, the deformable teeth of one element fully mesh with the teeth of the other element without back-lash. However, this gearing arrangement is only suitable for very light loads since, due to the deformability of the teeth, slippage of the meshing toothed elements can occur.

European patent specification No. 0 084 197 also offers a solution to the problem of back-lash in gearing mechanisms. The gearing mechanism of EP 0 084 197 comprises a pair of meshing toothed elements, each of which have teeth of transverse asymmetrical shape which, when meshing, are urged into contact with each other in a direction normal to the plane of rotation of the toothed elements. In addition, the teeth of the toothed elements may be slotted to improve their deformability and thus ensure no-backlash. This arrangement necessitates the inclusion of means for urging the meshing toothed elements into contact in a direction normal to the plane of rotation of the toothed elements.

United Kingdom specification No. 1 202 806 also offers a solution to the problem of back-lash in gearing mechanisms. The solution discussed is even more similar to that of GB 1 251 941 than that of EP 0 084 197. The gearing mechanism of GB 1 202 806, whilst being an internal/ring gear mechanism, utilises the principle of having a first meshing toothed element with teeth formed of deformable material urged into meshing engagement with a second toothed element, wherein the deformable teeth, when meshing, deform to completely mesh with the teeth of the second toothed element thereby preventing back-lash. This gearing mechanism is also susceptible to slippage due to the high deformability of the teeth.

OBJECTS AND SUMMARY OF THE INVENTION

It is an object of the present invention to obviate and mitigate the aforesaid disadvantages of the prior art gearing mechanisms by providing a gearing mechanism for eliminating back-lash without unduly compromising the drive capabilities of the mechanism so formed.

According to the present invention there is provided a gearing mechanism comprising meshing toothed elements wherein at least some of the teeth of one of said elements have an undulated longitudinal transverse section whereby the elements can be meshed such that at any one time one of the teeth having an undulated longitudinal transverse section makes at least one point of contact with each of two opposing adjacent teeth of the other element.

Preferably, all of the teeth of one of the elements have an undulated longitudinal transverse section.

Preferably further, all of the teeth of the other element have a corresponding conversely undulated longitudinal transverse section.

Preferably also, the teeth of the meshing toothed elements having an undulated longitudinal transverse section have a regularly undulated form.

The teeth of the meshing toothed elements may be resiliently deformable.

The meshing toothed elements may each be generally in the form of gear wheels.

Alternatively, one of said meshing toothed elements may be a rack, thus providing a gearing mechanism in the form of a rack and pinion.

Preferably, the pitch of teeth on one meshing toothed element exceeds by a small amount the spaces between teeth of the other meshing element.

The gearing mechanism may comprise a spur gear, bevel gear or internal gear mechanism.

BRIEF DESCRIPTION OF THE DRAWINGS

The foregoing and further features of the present invention will be more readily understood from the following description of preferred embodiments, by way of example thereof, with reference to the accompanying drawings, of which.

DETAILED DESCRIPTION OF THE PREFERRED EMBODIMENT

Figure 1A:
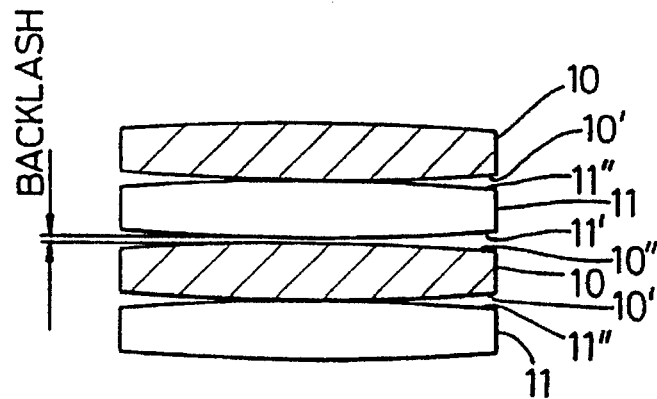
FIG. 1a is a diagrammatic view of the periphery of a pair of involute gears of known construction, partially developed in a plane and appropriately labeled "PRIOR ART"

Referring to the drawings, FIG. 1a diagrammatically shows the periphery of a pair of normal involute gears (10, 11) partially developed in a plane to illustrate meshing tooth contact between the teeth of the gears (10, 11). In a known gearing mechanism such as this, the teeth of a driving gear 10 (shown by shading hatched lines) mesh with the teeth of a driven gear 11 such that the leading flanks 10' of the teeth of the driving gear 10 contact with the trailing flanks 11" of respective teeth of the driven gear 11 in order to transmit drive from the driving gear 10 to the driven gear 11. A gap, referred to as back-lash, exists between the trailing flank 10" of each tooth of the driving gear 10 and the leading flank 11' of a rearward or trailing tooth of the driven gear 11.

Figure 1B:
FIG. 1b is a profile of the teeth of each of the gears of FIG. 1a and appropriately labeled "PRIOR ART"

FIG. 1b shows a profile of the teeth of the gears comprising the gearing mechanism of FIG. 1a. The teeth are of conventional profile which will be contrasted with the desired profiles of teeth for the toothed elements of the embodiments of the present invention as hereinafter described.

Backlash can be a problem on transmissions that are unidirectional, particularly where light loads are encountered. Under such conditions the teeth of a driving gear can intermittently lose contact with the teeth of a driven gear due to slight fluctuations in load, and gear rattle can result. This is, in fact, commonly encountered in automotive applications. Backlash is, however, a particular problem in a bi-directional transmission system in which, on reversal of the drive, the driven gear 11, which now becomes the driving gear, must rotate, albeit by a small amount equivalent to the backlash, before drive in the reverse direction is established. This movement of the driven gear 11 (now the driving gear) prior to establishment of transmission drive is also referred to as back-lash and is undesirable because it can create transmission shocks which can result in damage to the gear teeth.

The problem of back-lash is also not particularly a problem in power transmission systems but creates grave problems in providing transmission systems in the form of gearing mechanisms for precise control of the location of a structure, for example, in robotics, machine tool apparatii, or measuring devices.

Figure 2:
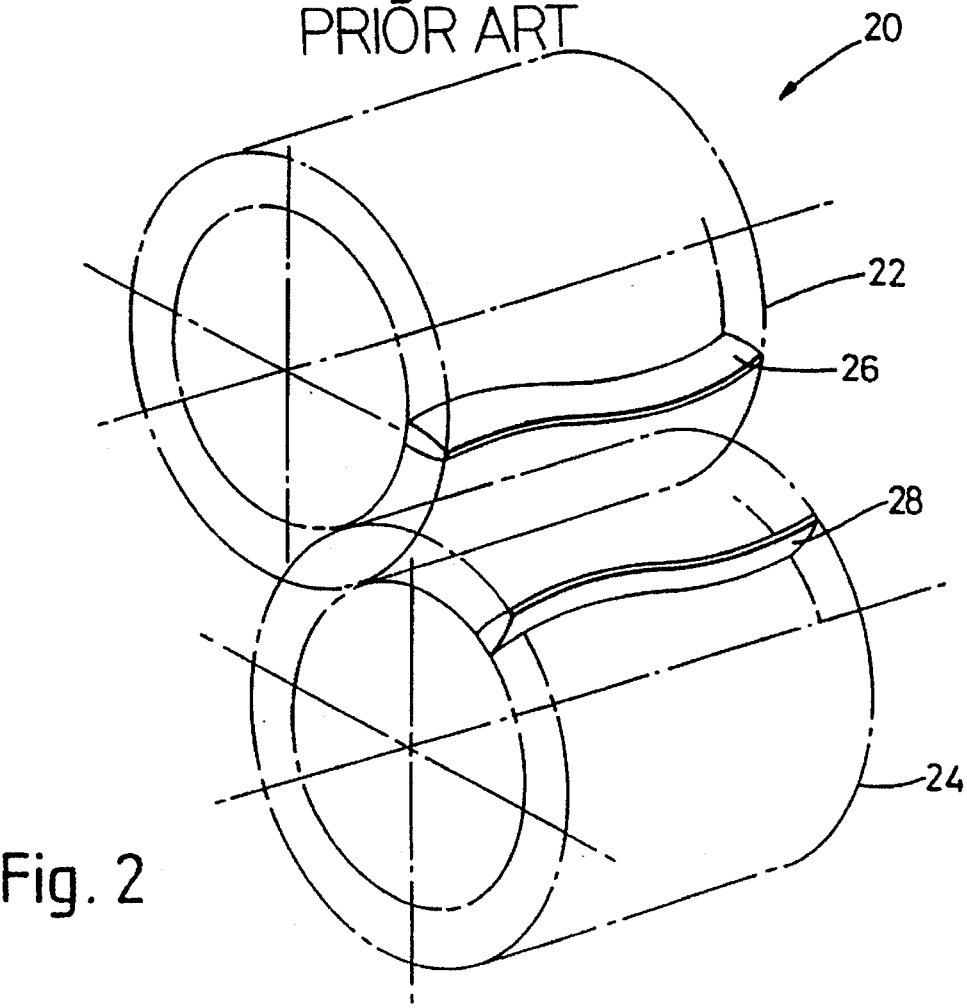
FIG. 2 is a perspective view of a gearing mechanism in accordance with a first embodiment of the present invention.

FIG. 2 shows a perspective view of a gearing mechanism 20 in accordance with a first embodiment of the present invention. The gearing mechanism comprises first and second toothed elements in the form of gear wheels (22, 24), each being shown with a single tooth (26, 28) for sake of clarity. The teeth (26, 28) on the gear wheels (22, 24) are of identical form, being regularly undulated and each generally in the form of an "S"-shape in a transverse direction. Hence, as seen in FIG. 3, the curve formed by each tooth (26,28) has a maxima or peak P and a minima or valley V each located between the endpoints of the curve. The pair of endpoints formed by each tooth also define end points of an imaginary straight line. The maxima defines a maximum transverse distance of extension of said curve from a first side of said imaginary line and defines a point of contact with one of the two opposing adjacent teeth of the other element, and said minima defines a maximum transverse distance of extension of said curve from a second side of said imaginary line and defines a point of contact with the other of the two opposing adjacent teeth of the other element. The teeth of the first gear wheel 22 are of different hand when compared to those on the second gear wheel 24 such that, when meshing, each tooth (26, 28) contacts at a point of curvature on a drive side and contacts at a reversely directed point of curvature on a driven side.

The pitch of the teeth (26, 28) on the gear wheels (22, 24), that is as measured from the leading point of curvature to the trailing point of curvature, preferably exceeds, by a small predetermined amount, the thickness of the tooth space into which the teeth mesh such that the gear wheels (22, 24) are sprung into meshing engagement and the "S"-configuration of the teeth (26, 28) deform slightly on both gears, thereby preventing back-lash. The teeth are of slender proportions to facilitate the springing of the gears into meshing.

Whilst it is preferred that all of the teeth (26, 28) on each of the gears (22, 24) have an undulated form as aforesaid, it will be understood that the gearing mechanism will still prevent back-lash even where only some of the teeth on one of the gear wheels has an undulated form, provided that at any point in time, at least one tooth of undulated form is in meshing contact with radially and axially adjacent teeth of the other gear wheel. Indeed, both gear wheels may comprise a combination of teeth of conventional form and teeth having an undulated form as aforesaid.

Figure 3C:
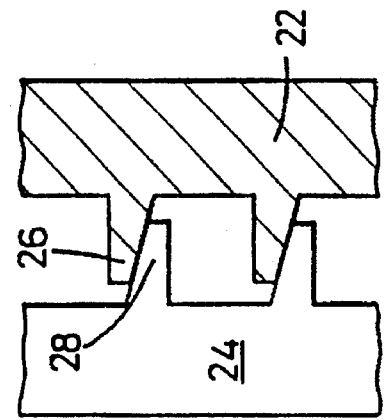
FIG. 3c is a sectional view along line 3(c)—3(c) of FIG. 3a diagrammatically illustrating the tooth contact pattern between the gears of the first embodiment at a chosen position along the face width of the gears.
Figure 3A:
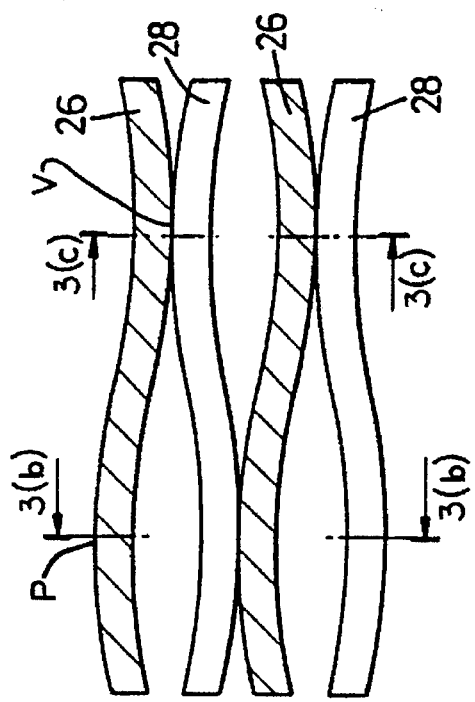
FIG. 3a is a diagrammatic view of the periphery of a pair of gears forming the embodiment of the invention shown in FIG. 2, partially developed in a plane.

FIG. 3a more readily illustrates the meshing contact between the teeth (26, 28) of the first and second gear wheels (22, 24) of the gearing mechanism of FIG. 2. It can be seen that the teeth 26 of the first gear 22 wheel (shown by shaded lines) mesh with those of the second gear wheel such that each tooth makes at least one point of contact with each of two adjacent teeth on the other gear wheel.

Figure 3B:
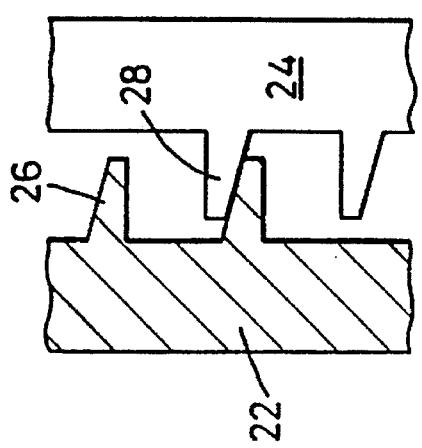
FIG. 3b is a sectional view along line 3(b)—3(b) of FIG. 3a diagrammatically illustrating the tooth contact pattern between the gears of the first embodiment at a chosen position along the face width of the gears.

FIGS. 3b and 3c respectively show the pattern of contact between teeth of the respective gear wheels at selected positions along the face width of the teeth.

Whilst it is envisaged that the teeth and gear wheels will be manufactured by conventional means such as machining from metal, the teeth, and the gear wheels for that matter, may be formed from any suitable material including rubber and plastics materials. However, it is envisaged that the materials from which the teeth are formed will have greater rigidity than the materials utilised in the prior art gearing mechanisms as aforementioned thereby avoiding the problem of slippage between the meshing gear wheels.

Figure 4B:
FIGS. 4a and b show alternative tooth profiles for the gears of the first embodiment of the invention.
Figure 4A:

FIGS. 4a and 4b illustrate two preferred tooth profiles for the present invention. The tooth profile of FIG. 4b is, however, only suitable where the mating gear has teeth having a profile as illustrated in FIG. 4a. FIG. 4a illustrates a gear face depth which is higher than normal to achieve the correct proportions to function as aforementioned and to provide the gear teeth with some resilience.

Figure 5:
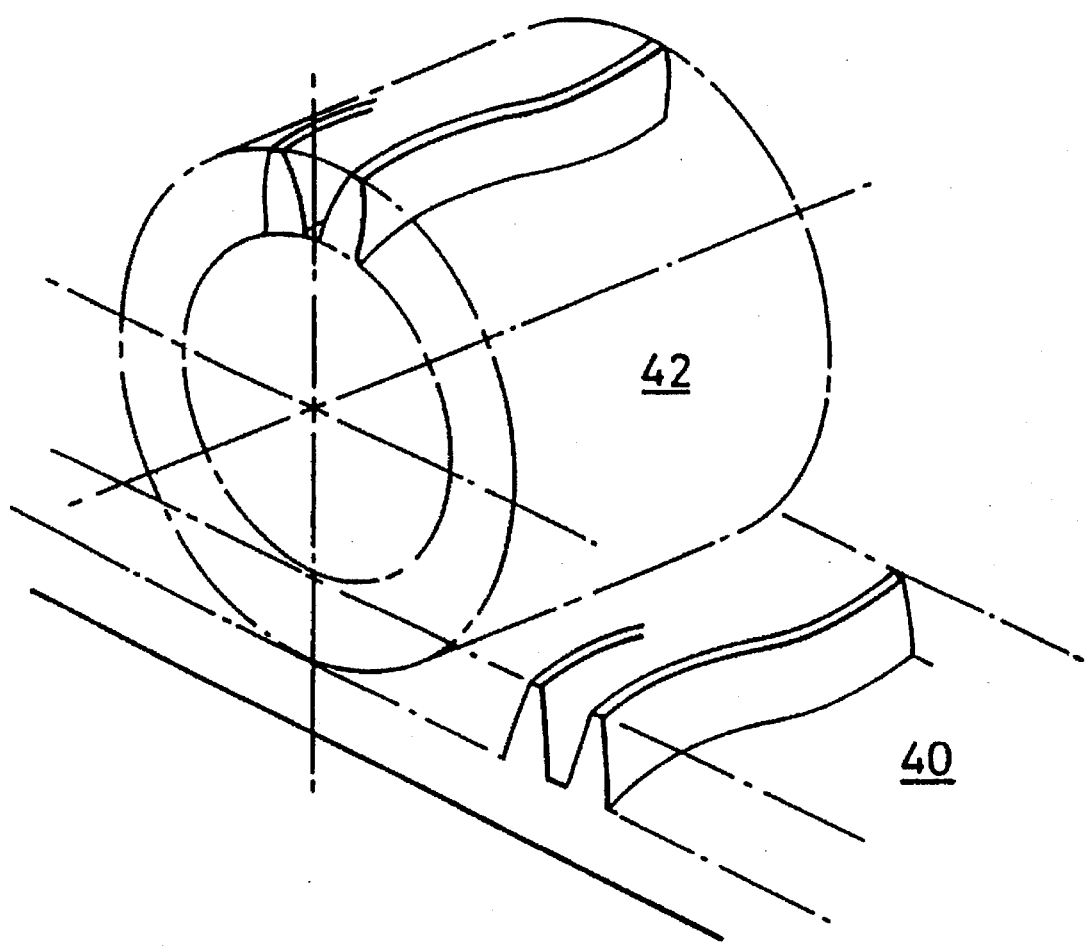
FIG. 5 is a perspective view of a second embodiment of the present invention.

FIG. 5 illustrates a second embodiment of the invention which is in the form of a rack 40 and pinion 42 gear. However, back-lash is eliminated in this embodiment in an identical manner to that described above.

In the embodiments of the invention, the gears may be spur or helical, but most likely have a modified involute tooth shape. The tooth will preferably have a high aspect ratio and be of fine pitch. It is probable that the top or radially outermost 50 to 60% of the tooth only will contact during meshing, but the remainder of the tooth depth will contribute to the flexibility required to enable contact on both flanks, without exceeding root or tooth flank stresses.

The gearing mechanisms of the present invention provide a means for achieving accurate location of any structure that is positioned by gears, with no loss of movement at the point of reversal. This is particularly useful in applications such as robotics, machine tools and measuring devices.

In addition, the gearing mechanisms of the present invention reduce noise and high dynamic tooth loads which can be present due to fluctuating torque conditions accentuated by back-lash or "wind-up" (accumulated back-lash).

I claim:

1. A gearing mechanism comprising: meshing toothed elements, wherein at least some of the teeth of one of said elements have an undulated longitudinal transverse section whereby said elements can be meshed such that at any one time one of the teeth having an undulated longitudinal transverse section makes at least one point of contact with each of two opposing adjacent teeth of the other element, and wherein a curve formed by each of the teeth having an undulated transverse section is generally S-shaped and has 1) a pair of end points which also define end points of an imaginary straight line, 2) a maxima positioned between said end points, and 3) a minima positioned between said end points, wherein said maxima defines a maximum transverse distance of extension of said curve from a first side of said imaginary line and defines a point of contact with one of the two opposing adjacent teeth of the other element, and wherein said minima defines a maximum transverse distance of extension of said curve from a second side of said imaginary line and defines a point of contact with the other of the two opposing adjacent teeth of the other element.

2. A gearing mechanism as claimed in claim 1, wherein each tooth of said one element has an undulated longitudinal transverse section.

3. A gearing mechanism as claimed in claim 1, wherein the teeth of the meshing toothed elements are resiliently deformable.

4. A gearing mechanism as claimed in claim 1, wherein the meshing toothed elements are each generally in the form of a gear wheel.

5. A gearing mechanism as claimed in claim 1, wherein one of said meshing toothed elements is in the form of a gear wheel and the other is in the form of a rack, thus providing a gearing mechanism in the form of a rack and pinion.

6. A gearing mechanism as claimed in claim 1, wherein the pitch of teeth on one meshing toothed element exceeds by a small amount the spaces between teeth of the other meshing element.

7. A gearing mechanism as claimed in claim 1, wherein the gearing mechanism comprises a spur gear.

8. A gearing mechanism as claimed in claim 1, wherein only an radially outer portion consisting of between 50% and 60% of the radial height of each of the teeth having an undulated transverse section makes contact with other teeth during meshing.

9. A gearing mechanism as claimed in claim 1, wherein only a radially outer portion consisting of between 50% and 60% of the radial height of said at least one tooth makes contact with other teeth during meshing.

10. A gearing mechanism comprising:
meshing toothed elements, wherein at least each tooth of one of said elements have an undulated longitudinal transverse section, whereby said elements can be meshed such that at any one time one of the teeth having an undulated longitudinal transverse section makes at least one point of contact with each of two opposing adjacent teeth of the other element, and wherein each tooth of the other element has a correspondingly conversely undulated longitudinal transverse section.

11. A gearing mechanism comprising:
(A) a first toothed element presenting a plurality of teeth; and
(B) a second toothed element presenting a plurality of teeth meshing with the teeth of said first toothed element, wherein at least one of the teeth of said first toothed element has an undulated longitudinal transverse cross section and contacts simultaneously at least two opposing teeth of said second toothed element, and wherein said undulated longitudinal cross section of said at least one tooth on said first toothed element is generally S-shaped such that a curve formed by said at least one tooth has 1) a pair of end points which also define end points of an imaginary straight line, 2) a maxima positioned between said end points, and 3) a minima positioned between said end points, wherein said maxima defines a maximum transverse distance of extension of said curve from a first side of said imaginary line and defines a point of contact with one of the two opposing adjacent teeth of the second toothed element, and wherein said minima defines a maximum transverse distance of extension of said curve from a second side of said imaginary line and defines a point of contact with the other of the two opposing adjacent teeth of the second toothed element.

12. A gearing mechanism, comprising:
(A) a first toothed element presenting a plurality of teeth; and
(B) a second toothed element presenting a plurality of teeth meshing with the teeth of said first toothed element, wherein at least one of the teeth of said first toothed element has an undulated longitudinal transverse cross section and contacts simultaneously at least two opposing teeth of said second toothed element, wherein each of the opposing teeth of said second toothed element has an undulated longitudinal transverse cross section, wherein the undulations of the opposing teeth of said second toothed element extend conversely to the undulations of the at least one tooth of said first toothed element.

13. A gearing mechanism as defined in claim 11, wherein all of the teeth of each of said first and second toothed elements have an undulated longitudinal transverse cross section.

14. A gearing mechanism as defined in claim 13, wherein the pitch of the teeth of said first toothed element, as measured from a leading point of curvature to a trailing point of curvature of the undulations of the teeth, exceeds the thickness of spaces formed between adjacent teeth of said second toothed element.

15. A gearing mechanism as defined in claim 11, wherein said first and second toothed elements both comprise gear wheels.

16. A gearing mechanism as defined in claim 11, wherein said first toothed element comprises a gear wheel and said second toothed element comprises a rack.

17. A gearing mechanism comprising:
(A) a first toothed element presenting a plurality of teeth; and
(B) a second toothed element presenting a plurality of teeth, wherein
spaces are formed between the teeth of said second toothed element and receive the teeth of said first toothed element, wherein
each of the teeth of said first toothed element has an undulated longitudinal transverse cross section, wherein
each of the teeth of said second toothed element has an undulated longitudinal transverse cross section, wherein
the undulations of the teeth of said second toothed element extend conversely to the undulations of the teeth of said first toothed element, wherein
the teeth of said first toothed element mesh with the teeth of said second toothed element such that each of the teeth of said first toothed element has a first point of contact with a first tooth of said second toothed element and a second point of contact with a second tooth of said second toothed element, said first and second points of contact being spaced tranversely from one another, and wherein
the pitch of the teeth of said first toothed element, as measured from a leading point of curvature to a trailing point of curvature of the undulations of the teeth, exceeds the thickness of the spaces formed between the adjacent teeth of said second toothed element, such that said first and second toothed elements are sprung into meshing engagement with one another and such that the undulations of the teeth of said first and second elements deform, thereby preventing backlash.

18. A gearing mechanism as defined in claim 17, wherein each of said teeth is generally S-shaped such that a curve formed by each of said teeth has 1) a pair of end points which also define end points of an imaginary straight line, 2)

a maxima positioned between said end points, and 3) a minima positioned between said end points, wherein said maxima defines a maximum transverse distance of extension of said curve from a first side of said imaginary line and defines a point of contact with one of the two opposing adjacent teeth of the other element, and wherein said minima defines a maximum transverse distance of extension of said curve from a second side of said imaginary line and defines a point of contact with the other of the two opposing adjacent teeth of the other element.

* * * * *